(12) United States Patent
Scheib et al.

(10) Patent No.: US 11,970,148 B2
(45) Date of Patent: Apr. 30, 2024

(54) METHOD FOR ACTIVATING A PARKING BRAKING FUNCTION AND A BRAKING SYSTEM

(71) Applicant: Continental Teves AG & Co. OHG, Frankfurt am Main (DE)

(72) Inventors: Ralf Scheib, Wald-Michelbach (DE); Heinz-Anton Schneider, Niedernhausen (DE); Christof Maron, Usingen (DE); Gunther Seipel, Erzhausen (DE); Giulio Brezza, Savona (IT)

(73) Assignee: Continental Automotive Technologies GmbH, Hannover (DE)

( * ) Notice: Subject to any disclaimer, the term of this patent is extended or adjusted under 35 U.S.C. 154(b) by 856 days.

(21) Appl. No.: 17/018,187

(22) Filed: Sep. 11, 2020

(65) Prior Publication Data

US 2020/0406870 A1     Dec. 31, 2020

Related U.S. Application Data

(63) Continuation of application No. PCT/EP2019/056143, filed on Mar. 12, 2019.

(30) Foreign Application Priority Data

Mar. 13, 2018     (DE) ...................... 10 2018 203 776.0

(51) Int. Cl.
*B60T 7/12*     (2006.01)
*B60T 1/06*     (2006.01)
(Continued)

(52) U.S. Cl.
CPC ................ *B60T 7/12* (2013.01); *B60T 1/067* (2013.01); *B60T 13/58* (2013.01); *B60T 13/74* (2013.01);
(Continued)

(58) Field of Classification Search
CPC . B60T 7/12; B60T 7/122; B60T 1/067; B60T 13/58; B60T 13/74; B60T 13/746;
(Continued)

(56) References Cited

U.S. PATENT DOCUMENTS

2002/0033642 A1    3/2002   Holl
2006/0261764 A1    11/2006  Erban et al.
(Continued)

FOREIGN PATENT DOCUMENTS

CN    1898110 A      1/2007
CN    101835664 A    9/2010
(Continued)

OTHER PUBLICATIONS

The Second Office Action dated Nov. 1, 2022 for the counterpart Chinese Patent Application No. 201980018620.9.
(Continued)

*Primary Examiner* — Michael J Zanelli

(57) ABSTRACT

A method for activating a parking brake function of a drum brake of a brake system of a vehicle, wherein a parking situation is taken into account in order to reduce the holding force to be exerted.

12 Claims, 1 Drawing Sheet

(51) Int. Cl.
B60T 13/58 (2006.01)
B60T 13/74 (2006.01)

(52) U.S. Cl.
CPC ....... *B60T 2210/20* (2013.01); *B60T 2250/00* (2013.01)

(58) Field of Classification Search
CPC ............. B60T 2210/20; B60T 2250/00; B60T 2201/06; B60T 8/245; F16H 63/48; F16H 2059/663; F16D 51/16; F16D 69/00; F16D 2066/001; B60Y 2400/81
See application file for complete search history.

(56) References Cited

U.S. PATENT DOCUMENTS

| | | | |
|---|---|---|---|
| 2008/0071454 | A1 | 3/2008 | Shiraki |
| 2008/0149437 | A1 | 6/2008 | Herges |
| 2010/0252381 | A1 | 10/2010 | Funke et al. |
| 2010/0312436 | A1 | 12/2010 | Hartwig |
| 2011/0224880 | A1 | 9/2011 | Baehrle-Miller et al. |
| 2012/0130581 | A1 | 5/2012 | Semsey et al. |
| 2014/0020997 | A1 | 1/2014 | Bach et al. |
| 2015/0203082 | A1 | 7/2015 | Forster et al. |
| 2015/0345580 | A1 | 12/2015 | Jung |
| 2016/0052496 | A1 | 2/2016 | Seto et al. |

FOREIGN PATENT DOCUMENTS

| | | | | |
|---|---|---|---|---|
| CN | 101903224 | A | 12/2010 | |
| CN | 102336182 | A | 2/2012 | |
| CN | 102574511 | A | 7/2012 | |
| CN | 104334422 | A | 2/2015 | |
| CN | 105270361 | A | 1/2016 | |
| CN | 105936261 | A | 9/2016 | |
| CN | 107000725 | A | 8/2017 | |
| DE | 10361042 | B3 | 5/2005 | |
| DE | 102004059688 | A1 | 6/2006 | |
| DE | 102005023665 | A1 | 11/2006 | |
| DE | 102007035541 | A1 | 2/2008 | |
| DE | 102008045693 | A1 | 3/2009 | |
| DE | 102008052847 | A1 | 5/2009 | |
| DE | 102016209784 | A1 | 6/2017 | |
| DE | 102016215990 | A1 | 3/2018 | |
| FR | 2813248 | A1 | 3/2002 | |
| JP | 2008068843 | A | 3/2008 | |
| KR | 1020140012985 | A | 2/2014 | |
| WO | WO-9729292 | A2 * | 8/1997 | ............ B60R 25/08 |
| WO | 99/39951 | A1 | 8/1999 | |
| WO | 2010/100276 | A1 | 9/2010 | |

OTHER PUBLICATIONS

Written Decision on Registration dated Nov. 28, 2022 for the Korean Patent Application No. 0-2020-7027888.

"VDA 305-100—Recommendation for Integrating Actuators of Electric Parking Brake into ESC Control Units", VDA Ad hoc AK project group interchangeability, version of Aug. 2014, VDA Verbrand der Autoindustrie, Benin, Germany.

International Search Report and Written Opinion dated May 24, 2019 from corresponding International Patent Application No. PCT/EP2019/056143.

Office Action dated Oct. 12, 2018 from corresponding German Patent Application No. DE 10 2018 203 776.0.

Written Opinion (translated and original), dated Oct. 22, 2021, from corresponding Korean patent application No. 10-2020-7027888.

First Office Action (translated and original), dated Jan. 27, 2022 from corresponding Chinese patent application No. 201980018620.9.

Search Report dated Jan. 18, 2022 rom corresponding Chinese patent application No. 201980018620.9.

Chinese Third Office Action dated May 19, 2023 for the counterpart Chinese Patent Application No. 201980018652.9 and DeepL translation of same.

* cited by examiner

METHOD FOR ACTIVATING A PARKING BRAKING FUNCTION AND A BRAKING SYSTEM

CROSS REFERENCE TO RELATED APPLICATIONS

This application claims priority to PCT International Application No. PCT/EP2019/056143, filed Mar. 12, 2019, which claims priority to German Patent Application No. DE 10 2018 203 776.0, filed Mar. 13, 2018, wherein the contents of such applications are incorporated herein by reference.

TECHNICAL FIELD

The disclosure relates to a method for activating a parking brake function of a drum brake of a brake system of a vehicle.

TECHNICAL BACKGROUND

Brake systems typically have both a service brake and also a parking brake. In this case, a service brake is used, in particular, to decelerate the vehicle while it is moving over a ground surface. A parking brake is used to secure a vehicle which has already come to a complete standstill or at least largely to a standstill and to hold it for a time in which the vehicle is to remain parked and to prevent it from rolling away, even on a slope. Parking brakes of this kind are realized as drum brakes, for example.

When a parking brake is activated, there is typically a hydraulic brake pressure in the service brake, which hydraulic brake pressure already holds the vehicle in place, for example even on a slope. When the driver then takes away the hydraulic pressure from the service brake, the required slope holding moment is transferred from the service brake to the parking brake, wherein brake linings are typically displaced in brake drums in order to build up the required counter-moment. This displacement of the brake linings in turn causes a change in the previously applied force on a parking brake lever, depending on the precondition for activating the parking brake. The change in force on the parking brake lever can be positive (increase in force) or negative (loss of force).

Methods for calculating a required force are known in the prior art, for example from document DE 10 2016 209 784 A1. In this case, it is typically necessary to keep a maximum loss of force available as an offset in order to reliably ensure the required slope holding moment. However, this increases energy consumption and operating time of an electric parking brake. In addition, the load is increased over the service life of installed actuators of the parking brake and other components since a maximum loss of force is always expected, although this is not always present.

What is needed is a way to provide a method for activating a parking brake function, which method, in comparison to the prior art, is carried out, as an alternative, in order to achieve a lower load on components for example.

BRIEF DESCRIPTION OF THE DRAWINGS

Further features and advantages will be found by a person skilled in the art from the exemplary embodiments described below with reference to the appended drawing, in which.

DETAILED DESCRIPTION

Figure 1:
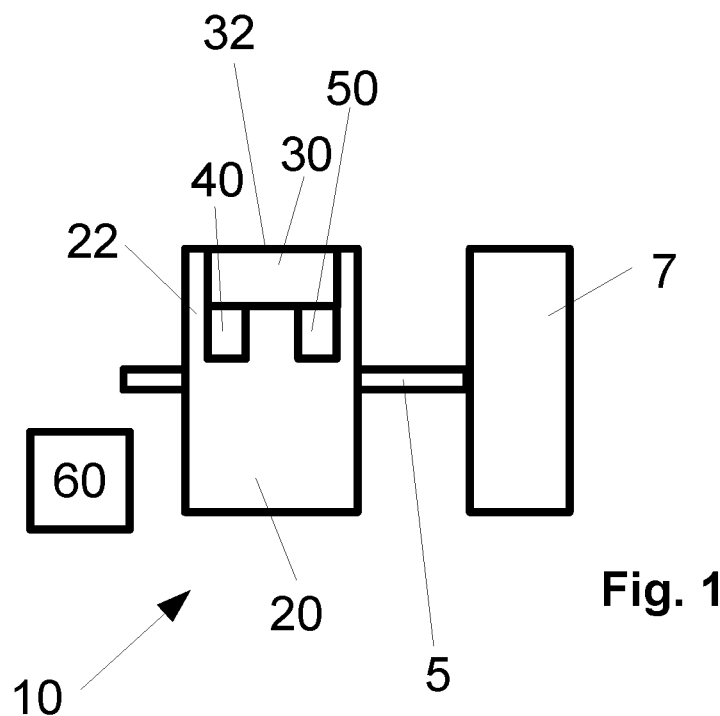
FIG. 1: shows a brake system according to a first exemplary embodiment.

FIG. 1 shows a brake system 10 according to a first exemplary embodiment. Said brake system is designed to carry out a method according to the invention.

The brake system 10 acts on a wheel 7 which is attached to an axle 5. The brake system 10 has a drum brake 20 with a brake drum 22 in which at least one illustrated brake shoe 30 is arranged. A brake lining 32 for braking the brake drum 22 is attached on said brake shoe.

A parking brake unit 40 and a service brake unit 50 are associated with the brake shoe 30. These are designed to press the brake shoe 30 against the brake drum 22 of the drum brake 20 and in this way to generate a braking effect. In this case, the parking brake unit 40 can be operated by an electric motor. The service brake unit 50 can be hydraulically operated.

The brake system 10 further has a control apparatus 60 which is configured to carry out calculation steps in the sense of a method according to the invention.

The control apparatus 60 receives signals from sensors, not illustrated, which relate to a slope gradient on which a vehicle in which the brake system 10 is installed is parked. Furthermore, the control apparatus 60 counts how often the parking brake unit 40 has already been operated. Depending on these values, said control apparatus calculates a switch-off current each time a parking brake function is requested.

If a parking brake function is actually requested, for example because a driver has operated a corresponding switch, a check is first made as to whether the vehicle has actually come to a standstill. It should be mentioned here that the vehicle is typically brought to a standstill by means of the service brake unit 50. Accordingly, a holding force is also exerted by the service brake unit 50, which initially holds the vehicle at a standstill.

The control apparatus 60 then generates a continuously increasing current for operating the parking brake unit 40. In this case, the current increases until the previously calculated switch-off current is reached. The current is then switched off and the parking brake function is maintained on account of the self-locking of the parking brake unit 40.

The functionality described enables states to be taken into account which allow the cut-off current to be reduced in comparison to a maximum switch-off current which is typically used in the prior art. This can considerably reduce the load on the components.

It should be mentioned that only a typical exemplary embodiment is explained here. In particular, the other signals described further above can accordingly also be taken into account by the control apparatus 60.

Figure 2:
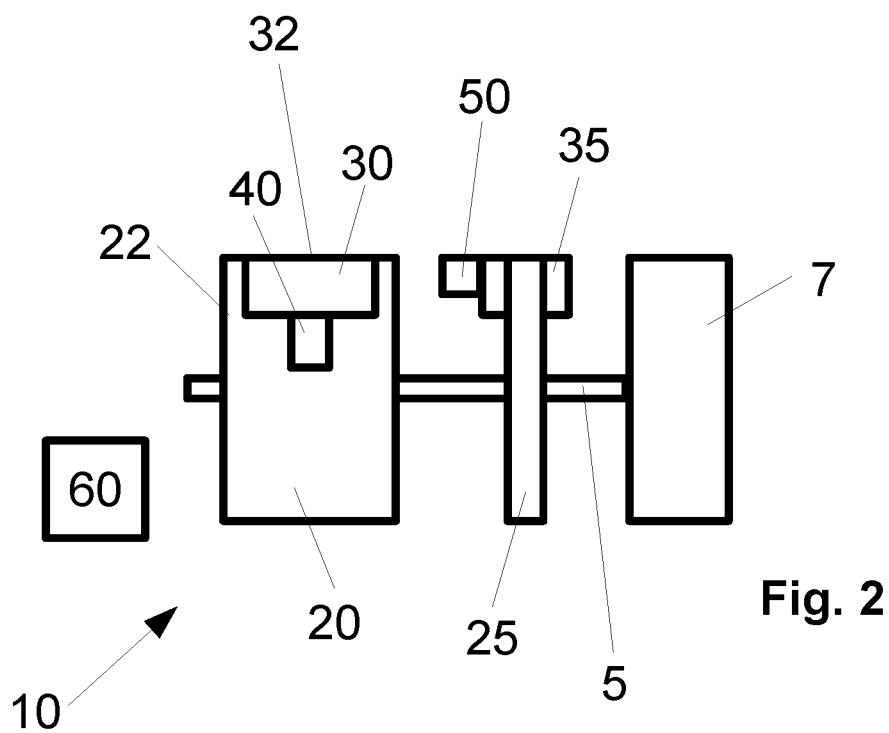
FIG. 2: shows a brake system according to a second exemplary embodiment.

FIG. 2 shows a brake system 10 according to a second exemplary embodiment. In contrast to the first exemplary embodiment, the service brake unit 50 is not integrated into the drum brake 20 in this case. Rather, the brake system 5 has a separate brake disk 25 which is mounted on the axle 5. The brake disk 25 has separate brake shoes 35 which can be operated by means of the service brake unit 50. The parking brake function and service brake function are therefore separated from one another. However, the functionality of the control device 60 is implemented in accordance with the first exemplary embodiment, so that reference can be made to the statements above.

The drum brake has a number of brake shoes and a number of parking brake units, wherein the brake shoes can be deflected at least by means of the parking brake units, and wherein the parking brake units can be electrically operated.

The brake system further has a number of service brake units.

The method comprises the following:
- determining a number of signals which characterize a parking situation of the vehicle,
- determining a switch-off current depending on the signals,
- operating the parking brake units by means of a current, and
- switching off the current when the current has reached the switch-off current.

Using the method, different parking situations can be identified and accordingly a switch-off current up to which the parking brake units are operated by means of a current can be calculated. For example, when the vehicle is on level ground, the switch-off current can be given a low value. When the vehicle is on a steep slope, the switch-off current can be particularly high. Therefore, in numerous parking situations in which a high slope holding moment is not required, the switch-off current can be reduced and therefore the load on the parking brake units, the brake shoes and other components can be considerably reduced.

The signals may be, in particular, measured values or output variables from sensors, calculated variables, parameters or states, wherein there should typically be a relationship between a respective signal and a parking situation of the vehicle.

At least one signal characterizes a slope gradient. This makes it possible to take into account how steep the incline on which the vehicle is parked is, or whether it is parked on a flat surface. Typically, the higher the slope gradient, the higher the switch-off current can be determined to be.

At least one signal characterizes a direction of travel when the service brake units were last operated. In particular, this can be understood to mean whether the vehicle has moved forward or backward. This makes it possible to take into account the direction in which the vehicle was previously driven.

At least one signal characterizes a calculated or required slope holding moment. As a result, an actually required slope holding moment can be included in the determination operation.

At least one signal characterizes a hydraulic pressure in the brake system. This makes it possible to take into account how hard a driver or else a vehicle controller braked the vehicle before the vehicle came to a standstill, wherein the hydraulic pressure can relate, in particular, to a hydraulic unit for actuating the service brake units. A high pressure which is applied by a driver or a controller can, for example, give rise to determining a lower switch-off current in order to avoid overloading.

At least one signal characterizes a coefficient of friction of brake linings of the brake shoes. This makes it possible to take into account that a low coefficient of friction, which can be caused by prolonged non-use for example, requires a higher slope holding moment and can therefore give rise to a higher switch-off current being determined.

At least one signal characterizes a required cable pull path when activating the parking brake units. This allows possible variations in the cable pull path to be taken into account.

At least one signal characterizes a temperature of the drum brake. It can therefore be taken into account that the braking effect of the drum brake can depend on the temperature, for example due to thermal expansion. At least one signal characterizes a number of activations of the parking brake units that have already taken place. This makes it possible to take into account the fact that parking brake units or other components age each time they are activated and therefore possibly require a higher braking force and therefore give rise to a higher switch-off current being determined.

It should be understood that all of the exemplary embodiments specified herein, in particular with regard to the signals, can be combined with one another in any desired manner. All groups and subgroups of this kind are a constituent part of the disclosure of this application.

The switch-off current is calculated based on an output value, wherein the output value is corrected or reduced by a number of correction values. In this case, only the correction values depend on the signals. The output value can therefore be calculated using known methods, for example as have been described in document DE 10 2016 209 784 A1 already mentioned at the outset. This value can then be corrected by correction values which depend on the signals and, in particular, can lead to a reduction. As already mentioned, this can reduce the load.

The service brake units can be operated, in particular, before the parking brake units are operated. In particular, they can be released after the current has been switched off. This corresponds to a normal stopping maneuver, wherein the vehicle is first braked using the service brake and then held for a longer period by the parking brake.

A holding force which is applied by the service brake units can be applied, in particular, entirely or partially by the parking brake units after the parking brake units have been operated. As a result, the required holding moment or torque, which is initially applied by a service brake, can then be taken over by the parking brake.

The current can, in particular, continuously increase when the parking brake units are operated. As a result, the parking brake can be applied successively, wherein switch-off takes place when the required switch-off current is reached. The service brake units can be, in particular, hydraulically operable, for example by a typical two-circuit brake system of a motor vehicle. In this case, a pressure for operating the service brake units can be built up manually, for example, in a master brake cylinder by means of a brake pedal, or it can also be automatically generated by means of a pump or a similar arrangement. However, as an alternative or in addition, the service brake units can also be electrically or electromechanically operated.

The parking brake units can be operated, in particular, by means of an electric motor or electromagnet. This corresponds to an embodiment of an electric parking brake which has proven to be advantageous.

In particular, the parking brake units can be of self-locking design. As a result, a permanently required holding force can be applied by the self-locking arrangement.

The invention further relates to a brake system. The brake system has a drum brake with a number of brake shoes. The brake system has a number of parking brake units and a number of service brake units. The brake shoes can be deflected at least by means of the parking brake units, wherein the parking brake units can be electrically operated. The brake system further has a control apparatus which is configured in order to carry out a method according to the invention. The method according to the invention renders possible the advantages already described further above. In respect of the method according to the invention, reference can be made to all of the embodiments and variants described herein.

According to one embodiment, each brake shoe can be operated both by means of at least one parking brake unit and also by means of one service brake unit. In other words, both at least one parking brake unit and also one service brake unit act on a respective brake shoe. In this way, a respective brake shoe can be used both for a service brake and for a parking brake. The corresponding embodiment can also apply only to some brake shoes. An embodiment of this kind corresponds, in particular, to a simplex brake.

According to one embodiment, each brake shoe can be operated only by means of a number of parking brake units and the service brake units are designed to act separately from the drum brake. This corresponds, for example, to a dual servo brake, wherein the drum brakes with the parking brake units are provided only for realizing a parking brake function. In this case, the service brake units can act, for example, on a disk brake or on a further drum brake.

For example, the preconditions actually present can be evaluated when an electric parking brake is activated in order to minimize situation-related loads on actuators and parts of the brake. Orientation of the vehicle on a slope can be used for this purpose, for example. For example, it is also possible to take into account whether the vehicle is parked downhill or uphill. A direction of travel when the service brake was last operated, a level of hydraulic pressure, a required slope holding moment due to the actual slope gradient, a temperature of a brake drum, a number of activations, a coefficient of friction of brake linings or a required cable path when activating an electric parking brake can also be taken into account.

Known methods can be used to calculate, for example, a switch-off current $i_{switch\_off}$ which takes into account a maximum loss of force as an offset value. Based on document DE 10 2016 209 784 A1 already mentioned at the outset, this can be done, for example, from a setpoint force $F_{setpoint}$, an idle current $i_{idle}$, a starting voltage $u_{start}$, a temperature $T_{env}$ and a hydraulic pressure $p_{hyd}$ using the following formula:

$$i_{switch\_off} = g(f_1(F_{setpoint}), f_2(i_{idle}), f_3(u_{start}, T_{env}), f_4(T_{env}), f_5(p_{hyd}), \ldots)$$

The switch-off current $i_{switch\_off}$ calculated in this way can then be reduced in a suitable manner to a new switch-off current $I_{switch\_off\_new}$:

$$i_{switch\_off\_new} = i_{switch\_off} \cdot g_{10}(f_{11}(\text{downhill}, -\text{uphill}), f_{12}(\text{direction of travel}), f_{13}(p_{hyd}), f_{14}(F_{setpoint}), f_{15}(T_{drum}), \ldots)$$

For this purpose, for example, the functions $f_{11}$ to $f_{15}$ can be empirically determined. The function $g_{10}(\ldots)$ can (for example additively) combine, for example, the results of the functions $f_{11}$ to $f_{15}$ and can handle special operating states separately (for example slope gradient or hydraulic pressure). An application process can, in particular, be ended as soon as the currently measured current is greater than the calculated switch-off current.

The function $f_{11}$ can make provision, for example, to distinguish between whether the vehicle is parked downhill or uphill. From measurements on test stands and vehicles it is known that, depending on the design of a brake, in particular a simplex brake (arrangement of the parking brake lever and the actuator), there is a loss of force or no loss of force at all or only a partial loss of force. If it can therefore be assumed on account of the parking situation that there will be no or only a slight loss of force on the parking brake lever, then function $f_{11}$ should be used to reduce the switch-off current of the actuator in a correspondingly suitable manner. Accordingly, the function $f_{12}$ can take into account a driving direction, the function $f_{13}$ can take into account a hydraulic pressure $p_{hyd}$, the function $f_{14}$ can take into account a setpoint pressure $F_{target}$ and the function $f_{15}$ can take into account a temperature $T_{drum}$ of a brake drum.

The mentioned steps of the method may be executed in the sequence indicated. However, they may also be executed in a different order. In one of its embodiments, for example with a specific combination of steps, the method may be carried out in such a way that no further steps are executed. However, in principle, further steps may also be executed, even steps of a kind which have not been mentioned.

The claims which form part of the application do not represent any dispensing with the attainment of further protection.

If it is found in the course of the proceedings that a feature or a group of features is not absolutely necessary, then the applicant aspires right now to a wording for at least one independent claim that no longer has the feature or the group of features. This may be, by way of example, a subcombination of a claim present on the filing date or may be a subcombination of a claim present on the filing date that is limited by further features. Claims or combinations of features of this kind requiring rewording are intended to be understood to be covered by the disclosure of this application as well.

It should further be pointed out that refinements, features and variants of the invention which are described in the various embodiments or exemplary embodiments and/or shown in the figures can be combined with one another in any desired manner. Single or multiple features may be interchanged with one another in any desired manner. Combinations of features arising therefrom are intended to be understood to be covered by the disclosure of this application as well.

Back-references in dependent claims are not intended to be understood as dispensing with the attainment of independent substantive protection for the features of the back-referenced dependent claims. These features may also be combined with other features in any desired manner.

Features which are disclosed only in the description or features which are disclosed in the description or in a claim only in conjunction with other features may fundamentally be of independent significance essential to the invention. They may therefore also be individually included in claims for the purpose of distinction from the prior art.

The invention claimed is:

1. A method for activating a parking brake function of a drum brake of a brake system of a vehicle, wherein the drum brake has a number of brake shoes and a number of parking brake units, wherein the brake shoes can be deflected at least by means of the parking brake units, and wherein the parking brake units can be electrically operated, wherein the brake system further has a number of service brake units, wherein the method comprises:
    determining a number of signals which characterize a parking situation of the vehicle;
    determining a switch-off current depending on the signals;
    operating the parking brake units by means of a current;
    switching off the current when the current has reached the switch-off current; and
    wherein each brake shoe can be operated by at least one parking brake unit and also by one service brake unit.

2. The method as claimed in claim 1, wherein at least one signal characterizes a slope gradient.

3. The method as claimed in claim 1, wherein at least one signal characterizes a direction of travel when the service brake units were last operated.

4. The method as claimed in claim 1, wherein at least one signal characterizes a hydraulic pressure in the brake system.

5. The method as claimed in claim 1, wherein at least one signal characterizes a coefficient of friction of brake linings of the brake shoes.

6. The method as claimed in claim 1, wherein at least one signal characterizes a temperature of the drum brake.

7. The method as claimed in claim 1, wherein at least one signal characterizes a number of activations of the parking brake units that have already taken place.

8. The method as claimed in claim 1, wherein the switch-off current is calculated based on an output value, wherein the output value is corrected or reduced by a number of correction values, and wherein only the correction values depend on the signals.

9. The method as claimed in claim 1, wherein each brake shoe can be operated by a number of parking brake units and the service brake units act separately from the drum brake.

10. A brake system comprising:
- a drum brake with a number of brake shoes;
- a number of parking brake units;
- a number of service brake units;
- wherein the brake shoes can be deflected at least by means of the parking brake units, and wherein the parking brake units can be electrically operated; and
- wherein the brake system further has a control apparatus which is configured in order to carry out a method including:
- determining a number of signals which characterize a parking situation of the vehicle;
- determining a switch-off current depending on the signals;
- operating the parking brake units by means of a current; and
- switching off the current when the current has reached the switch-off current.

11. The brake system as claimed in claim 10, wherein each brake shoe can be operated by at least one parking brake unit and also by one service brake unit.

12. The brake system as claimed in claim 10, wherein each brake shoe can be operated by a number of parking brake units and the service brake units act separately from the drum brake.

* * * * *